United States Patent [19]

Vaughan

[11] Patent Number: 4,630,316

[45] Date of Patent: Dec. 16, 1986

[54] TRANSITION BETWEEN RECTANGULAR AND RELATIVELY LARGE CIRCULAR WAVEGUIDE FOR A UHF BROADCAST ANTENNA

[76] Inventor: Thomas J. Vaughan, Box 440, Rye Beach, N.H. 03871

[21] Appl. No.: 484,220

[22] Filed: Apr. 12, 1983

Related U.S. Application Data

[63] Continuation of Ser. No. 449,734, Dec. 14, 1982, abandoned.

[51] Int. Cl.[4] ............................................ H04B 1/02

[52] U.S. Cl. .................................... 455/129; 343/890; 333/21 R; 333/251; 333/21 A

[58] Field of Search ................... 333/21 A, 21 R, 239, 333/242, 248, 251; 343/890, 884, 874, 905, 756, 850; 455/129

[56] References Cited

U.S. PATENT DOCUMENTS 2,607,849 8/1952 Purcell et al. .................... 333/35 X

FOREIGN PATENT DOCUMENTS 1099602 2/1961 Fed. Rep. of Germany ...... 333/239
2718684 11/1978 Fed. Rep. of Germany ...... 343/890

OTHER PUBLICATIONS

Proceeding of the Symposium on Modern Advances in Microwave Techniques, New York, N.Y., Nov. 8–10, 1954, pp. 330–334.

Southworth, George C., Principle and Applications of Waveguide Transmission, Princeton, N.J., pub. 1955, pp. 122–123.

"1057 Foot FM-TV Antenna", Broadcast News, vol. 59, RCA Corp., Nov. 3, 1950.

Farr, Harold K., "Mode Converter" *Official Gazette, U.S. Patent Office*, vol. 69, p. 587, Jun. 6, 1952.

Nagelberg, E. R. and Shefer J., "Mode Conversion in Circular Waveguide", *The Bell System Technical Journal*, Sep. 1965, pp. 1321–1338.

*Primary Examiner*—Eugene R. LaRoche
*Assistant Examiner*—Benny T. Lee
*Attorney, Agent, or Firm*—Robert T. Dunn

[57] ABSTRACT

A high power TV antenna for operation at the ultra high frequency (UHF) frequency F includes a radiating antenna located at the top of a tower structure (often hundreds of feet high), a transmitter at the bottom of the tower and a main circular waveguide transmission line of diameter Dl between the transmitter and the antenna carried by the tower; the feed to and/or from the transmission line including transition sections such that wave propagation in the transition sections is below cutoff for the TM01 mode while it is above cutoff for the dominant TE11 mode while wave propagation in the main circular waveguide transmission line of diameter Dl is substantially totally in the dominant TE11 mode even while it is above cutoff for the TM01 mode, whereby the transition sections tend to inhibit wave propagation in the system in the undesired TM01 mode.

9 Claims, 12 Drawing Figures

TE10 MODE

TE11 MODE

TRANSITION BETWEEN RECTANGULAR AND RELATIVELY LARGE CIRCULAR WAVEGUIDE FOR A UHF BROADCAST ANTENNA

BACKGROUND OF THE INVENTION

This is a continuation of co-pending patent application Ser. No. 449,734, (now abandoned) by the same inventor as the present invention, filed Dec. 14, 1982, entitled: A UHF Broadcast Antenna On A Tower With Circular Waveguide Carrying RF Energy Up The Tower To The Antenna.

The present invention relates to UHF high power (100 kw and greater) broadcast transmitting antenna systems and particularly to such a system for transmitting television broadcast channels 21 to 70, operating at 100 kw and greater and in which the transmission line between the transmitter and radiating antenna includes a substantial length of circular waveguide.

Broadcast antennas for television are frequently located on top of high towers that are constructed to offer minimum wind resistance. The transmitter is located on the ground near the tower and the radiating antenna is located at the top of the tower. A transmission line from the transmitter to the antenna is carried by the tower, usually at the outside of the structure and is attached thereto by hardware that includes hangers, ties, etc. The cost of the tower, the transmission line, its hardware, elbows, transitions, transformers, barriers, hangers, ties, etc., constitute just about the total cost of the antenna system. That cost, the cost of maintenance and the cost of operation are all important considerations. The cost of operation is directly determined by the efficiency of the transmission line from the transmitter to the antenna (everything else being equal).

Heretofore, UHF (120 to 1000 mhz) high power broadcast TV antennas for channels 21 through 70 have used rectangular waveguide rather than coaxial transmission line for conducting the RF power from the transmitter up the tower to the radiating antenna. Waveguide is preferred to coaxial line (coax), because the waveguide is more efficient, it costs less, it does not have an inner conductor and at the higher power requirements for UHF, in a six to nine inch diameter coaxial line, multi-moding occurs and this is undesireable. The only disadvantage of rectangular waveguide is that it offers a greater wind load and so the tower has to be constructed sturdier.

Due particularly to the higher order multi-moding and the undesireability of that moding, the Electronics Industry Association (EIA) has recommended that the upper limits of the use of coaxial transmission line be as set forth in the table below which is a comparison of the relative costs of coaxial and rectangular waveguide recommended by EIA for the UHF TV channels 26 through 70:

| | Coax line | | Rectangular Waveguide | |
|---|---|---|---|---|
| Channel | Size | $/Ft. | Size | $/Ft. |
| 70 | 6⅛ - 50 | 76 | WR - 1150 | 65 |
| 50 | 8 3/16 - 75 | 123 | WR - 1150 | 65 |
| 38 | 8 3/16 - 50 | 133 | WR - 1500 | 79 |
| 37 | 9 3/16 - 75 | 143 | WR - 1500 | 79 |
| 26 | 9 3/16 - 50 | 151 | WR - 1500 | 79 |

Clearly, the cost difference becomes quite significant for a one thousand foot tower and far exceeds the slight increase in costs of the supporting tower structure to accomodate the greater wind load of the rectangular waveguide over the coaxial transmission line.

However, many old towers are marginal in regard to the ability to withstand wind load and simply can not use rectangular waveguide, because of the added wind load. This has given rise to the use of circular instead of rectangular waveguide. The advantages of circular over rectangular waveguide are: lower wind load, greater efficiency, lower installation costs, no tortional twists and no rotation due to manufacturing twist. The disadvantage is that: unless the circularity of the circular waveguide along its entire length is maintained within very precise tolerances, the polarization of waves launched into the guide in the dominent TE11 mode is accompanied by a transverse polarization and by undesireable higher modes like the TM01 and so the efficiency of the coupling from the transmitter to the circular waveguide and from the circular waveguide to the antenna suffers. It is an object of the present invention to provide a method and means of overcoming these problems with circular waveguides.

SUMMARY OF THE INVENTION

A greater saving in the cost of the transmission line, the cost of the tower and the greater efficiency that results in lower operating costs can all be gained using a circular waveguide. The saving in operating costs follows directly from greater efficiency of transmission as determined by the attenuation of the transmission line. FIG. 1 is a graph of UHF frequency (TV channel) verses transmission line attenuation (db/100 ft.) for coaxial, rectangular waveguide and circular waveguide, of the sizes recommended by EIA for UHF TV broadcast. This figure shows that the greatest potential efficiency is achieved with the circular waveguide and so the operating costs with circular waveguide is less. In addition to that, the wind load for circular waveguide is less than for rectangular and so the tower structure is less costly. Finally, the cost of circular waveguide is less than the equivalent coax or rectangular waveguide. A comparison of equivalent rectangular and circular waveguide transmission lines for the UHF TV channels, their relative efficiencies and their relative wind loads is set forth in the table below.

| | Rectangular Waveguide | | | Circular Waveguide | | |
|---|---|---|---|---|---|---|
| Channels | Size | Wind #/Ft. | Eff. % | Size | Wind #/Ft. | Eff. % |
| 48–70 | WR - 1150 | 48 | 74–78 | WC 1161 | 31 | 79–83 |
| 33–48 | WR - 1150 | 48 | 74–78 | WC 1359 | 37 | 82–87 |
| 21–33 | WR - 1500 | 63 | 82–86 | WC 1590 | 43 | 85–89 |

The propagation of all energy in a circular waveguide is analagous to propagation in a rectangular waveguide. In both, an infinite variety of modes is possible and all those fall into one of two classes: transverse-electric and transverse-magnetic. The dominant modes are: for rectangular, the TE10 mode and for circular, the TE11 mode. These are analagous, but very different. The rectangular TE10 electric field is linearly polarized perpendicular to the greatest crosswise dimension of the waveguide and there is no linearly polarized mode transverse thereto.

The circular TE11 mode is also linearly polarized, but there can be the same mode polarized transverse thereto. Theoretically, the two transverse modes (the two directions of polarization) are entirely independent of each other where the circularity of the waveguide is perfect. In practice, however, it is not perfect and so it is impossible for pure polarization (polarization in only one direction) to exist and as a result, cross polarization occurs. This cross polarization can be minimized by maintaining close tolerances of circularity of the waveguide (within a few thousandths of an inch). The cross polarization is undesireable because it reduces the efficiency of the transmission line and, in particular, it reduces the overall efficiency of coupling from the transmission line to the system antenna.

It is an object of the present invention to provide a method and means of reducing the effects of such cross polarization in the circular waveguide transmission line and particularly for reducing these effects in a UHF, high powered TV broadcast antenna system that uses a substantial length of circular transmission line between the transmitter and antenna.

Another complication arises from the geometry of the circular waveguide. FIG. 2 is a graph showing the mode cutoff lines for circular waveguide diameter vs frequency. Operation close to the circular waveguide fundamental mode (TE11) cutoff frequency increases loss and increases dispersion. As the operating point is moved further from the cutoff for the TE11 mode, it moves first into the TM01 mode and then moving further yet it moves into the TE21 mode; and so the TM01 and the TE21 modes are possible. It is preferred that only the TE11 mode exist and at the same time the operating frequency be sufficiently above cutoff for the TE11 mode to avoid loss and dispersion. A reasonable compromise is achieved by placing the operating point above the cutoff for the TM01 mode and yet below the cutoff for the TE21 mode. This insures that there is no TE21 mode, but allows some TM01 mode. It is a particular object of the present invention to provide a method and means of reducing the amount of energy in the circular waveguide in the TM01 mode so that it is negligible.

Other objects and features of the present invention will be apparent from the following specific description of embodiments of the invention taken in conjunction with the Figures.

DESCRIPTION OF SPECIFIC EMBODIMENT OF THE INVENTION

Figure 9:
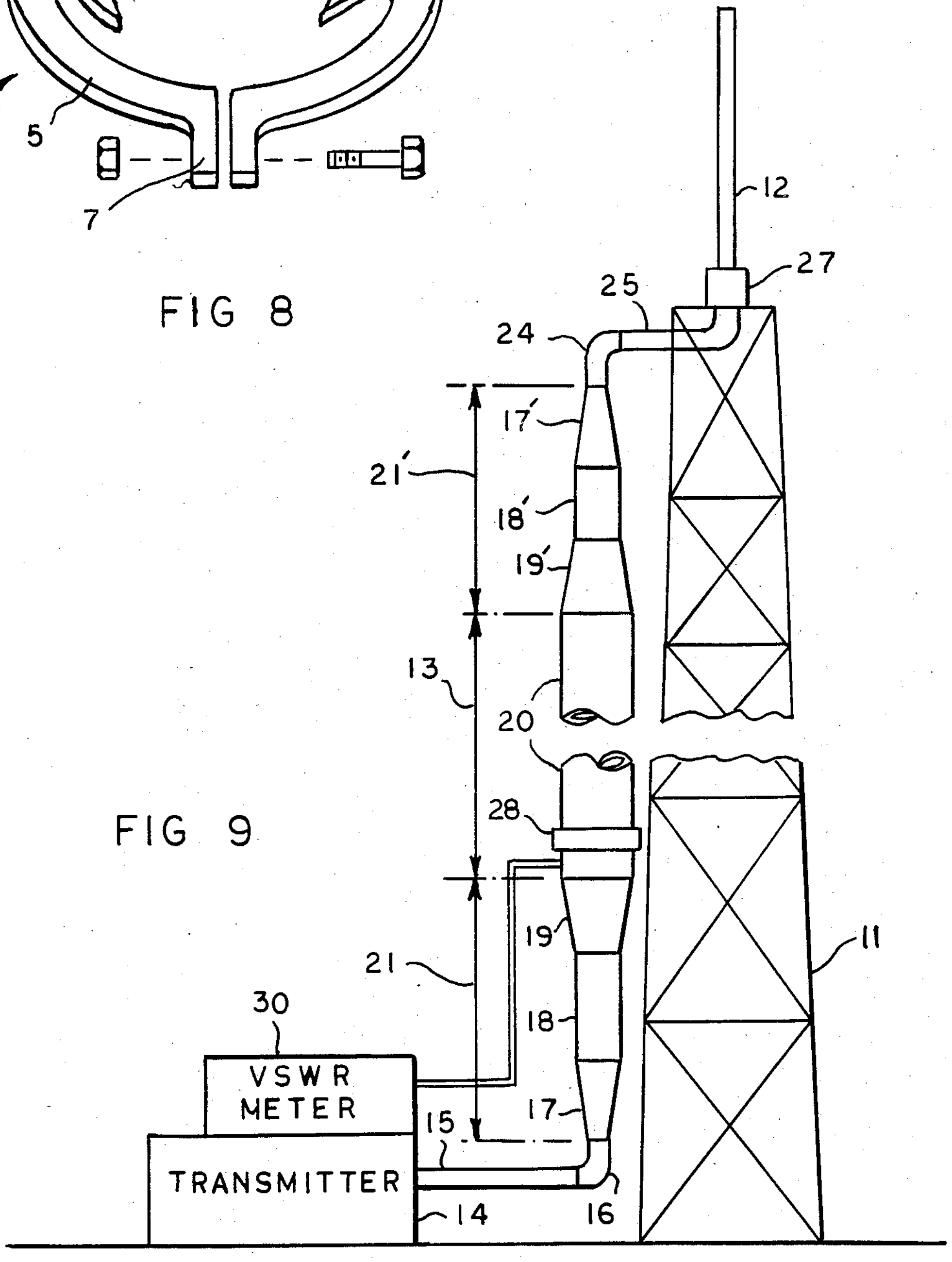
FIG. 9 illustrates a UHF TV broadcast antenna system including a tower, transmitter, antenna, main circular waveguide feed from the transmitter to the antenna, the transitions at each end between the main circular waveguide and the transmitter and antenna according to the present invention and the structure for producing ellipticity in the main circular waveguide in compensation for and as an adjustement of deformation and/or lack of perfect circularity of that waveguide.

As described and shown above, circular waveguide has low loss when compared with rigid coaxial or rectangular waveguide. Also its wind drag coefficient is lower than rectangular waveguide which results in lower wind loading. For these reasons it is proposed for use in a UHF TV broadcasting antenna where there is a long vertical run of circular waveguide transmission line up the antenna tower from the transmitter to the radiating antenna as illustrated in FIG. 9.

Heretofore, circular waveguide has not been used in such broadcast antenna systems, because any imperfections of the guide causes components in undesireable polarizations to occur or converts the linearly polarized wave to an elliptically polarized wave. The wave then gets trapped between the near and far end tapered transition sections between the circular and rectangular waveguides of the feed (sections 17 and 23 of FIG. 9), resulting in a very high voltage standing wave ratio (VSWR) therebetween. The circular geometry would have to be perfect. For example, it would have to be within a tolerance of less than a thousandth of an inch for the trapped wave not to exist. The technique described herein and claimed in the above mentioned copending application Ser. No. 449,734 is a technique of producing ellipticity in the polarization of the transmitted energy to accompany the intended polarization in compensation for undesired complementary polarizations. In other words, a polarization is intentionally created that negates the undesired polarization. That technique along with the transitions of the present invention combine to substantially reduce certain disadvantages of using circular waveguide as the main transmission line in a UHF broadcast high tower antenna system.

Transitions—Rectangular to Main Circular Waveguide

Typically the diameter of a circular waveguide is approximately given by:

$$D = 9300/F(\text{in MHz}) \text{ inches}$$

Figure 1:
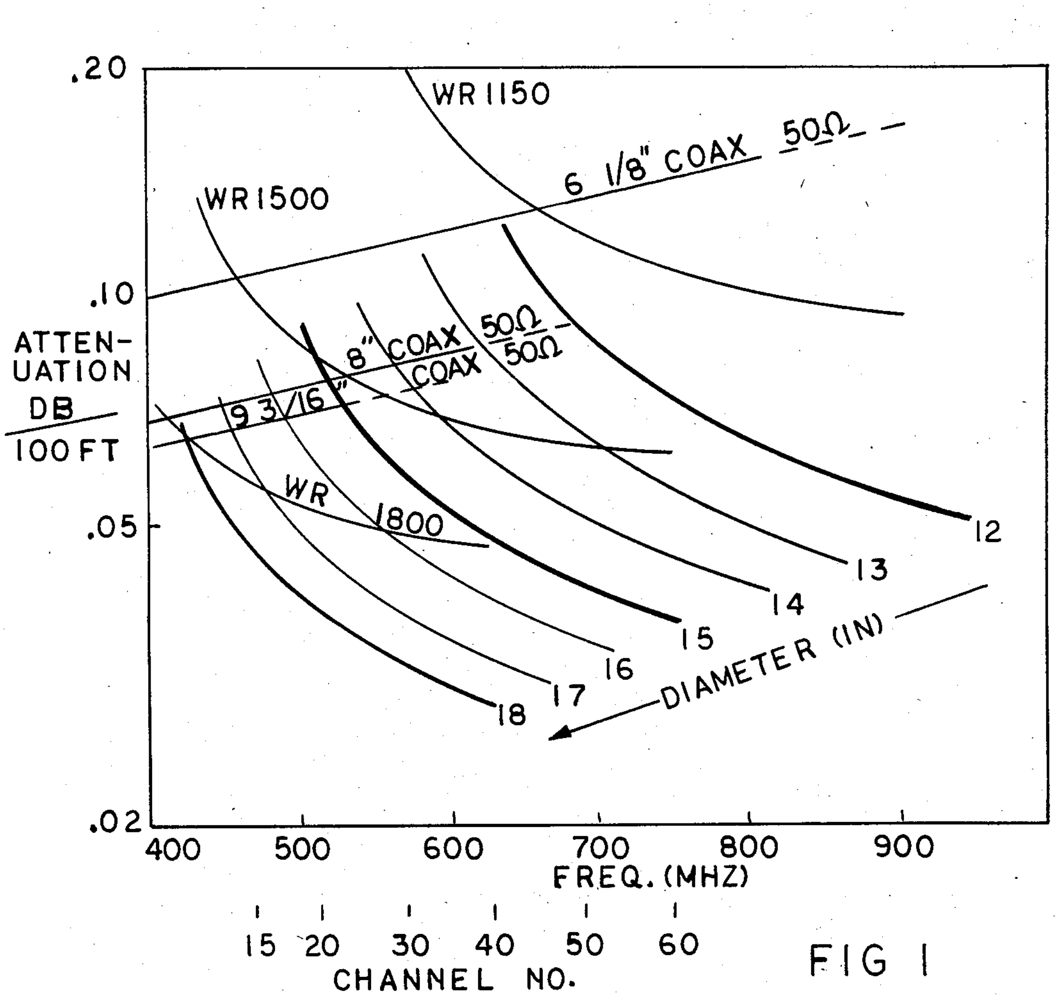
FIG. 1 is a graph of attenuation in db per 100 ft. over the UHF frequency range for coaxial, rectangular waveguide and circular waveguide transmission lines of equivalent sizes recommended by EIA.
Figure 2:
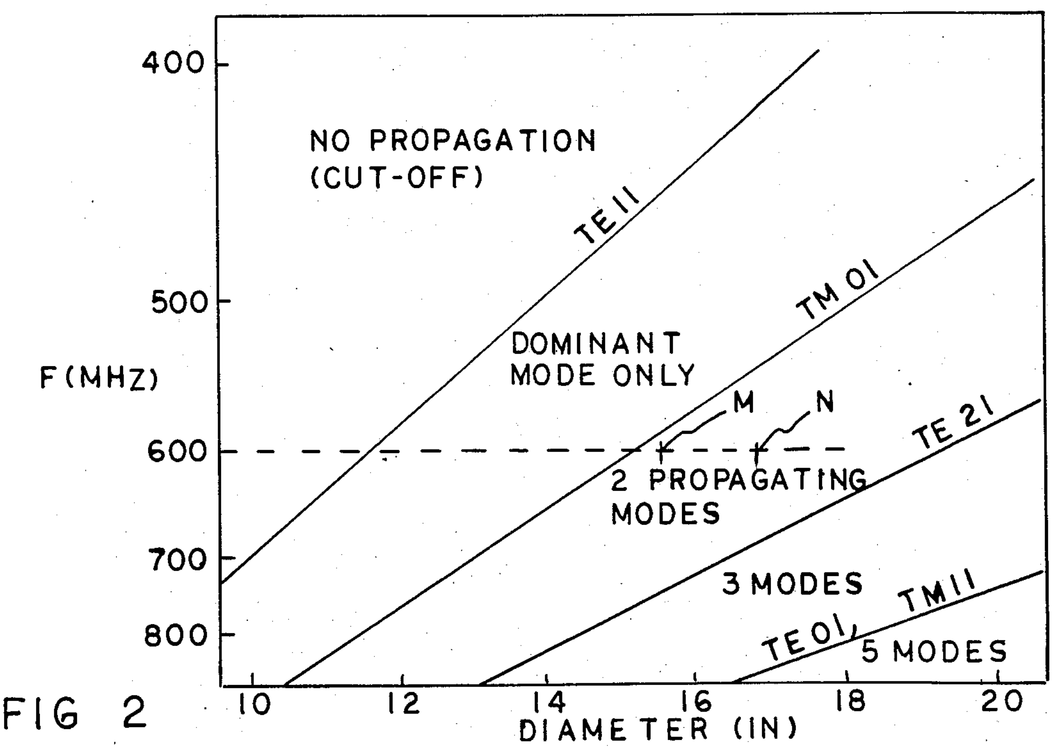
FIG. 2 is a graph of frequency verses circular waveguide transmission line diameter showing the cutoff lines for the TE11, TM01, TE21 and other higher modes of propagation.
Figure 3:
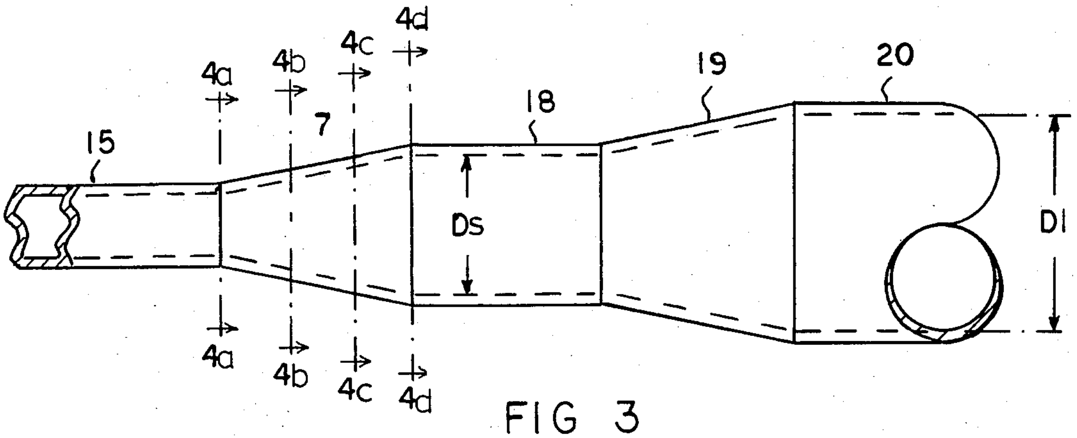
FIG. 3 shows transitions between rectangular and the relatively large diameter (D1) main circular waveguide according to the present invention.
Figure 4A:
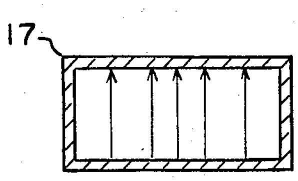
FIGS. 4*a*, 4*b*, 4*c* and 4*d* show the successive cross sections of the transition between the rectangular and the relatively small diameter (Ds) circular waveguide section of the transitions.
Figure 4B:
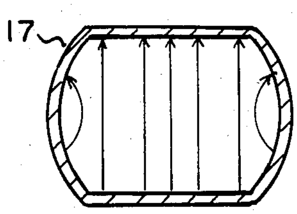
Figure 4C:
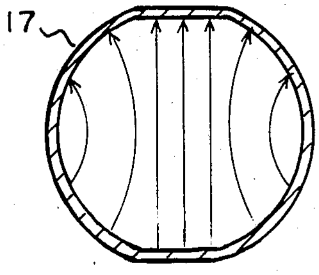
Figure 4D:
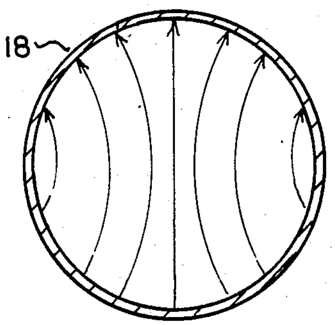

For example, at 600 MHz, the diameter will be about 15½ inches. FIG. 2 shows the modes present in a guide of given diameter for frequencies in the UHF range.

Complications arise from the geometry of the circular waveguide. Operating the guide too close to the dominant TE01 mode cutoff increases loss and increases dispersion. As the operating point for 600 MHz (on the broken line) is moved further from cutoff, FIG. 2 shows that: first the TM01 mode, then the TE21 mode, and further yet, even higher modes become possible. A reasonable compromise in this example places the operating point at M or N which is above the TM01 mode cutoff, but before the point where the TE21 mode can exist. The problem is, therefore, to find a way to insure that the TM01 mode does not occur and/or if it does occur, it will absorb negligible energy.

The example given above places the operation in the range where two modes are possible, both the desired TE11 mode and the undesired TM01 mode. In addition, the TE11 mode itself is capable of two different manifestations characterized by orthogonal polarizations. Hence, the unwanted polarization of the TE11 mode and the wholly undesireable TM01 mode must not occur or must be effectively suppressed. The fact that these unwanted modes of propagation can and do exist in the useful range of the circular waveguide, but usually do not exist in rectangular waveguide, is used effectively in the present invention along with the circular waveguide characteristics of mode cutoff frequency versus diameter to solve these problems.

Consider for example the feed from the transmiter 14 to the main circular waveguide 20 of the high power UHF broadcast antenna system shown in FIG. 9. This feed includes a rectangular waveguide up to the transition section 17 of the set of transitions 21 that includes 17, 18, and 19. A similar set of transitions 21' including transitions 17', 18' and 19' are provided at the top of the tower from the other end of the main circular transmission line to the antenna 12. An arrangement of the transitions in the set of transitions 21 is described in detail by FIGS. 3 and 4*a* to 4*d*. The rectangular waveguide 15 from transmitter 14 turns upward by elbow 16 and connects to the rectangular to circular waveguide section 17 that is matched to the rectangular waveguide 15 at the end connected thereto and at the other end is matched to the relatively small (smaller then the main of diameter D1) circular waveguide section 18 of diameter Ds.

The TM01 mode is cutoff in the Ds waveguide section at the operating frequency F and so that mode cannot arise between section 18 and the transmitter. The Ds section 18 connects to the main circular (D1) waveguide by a tapered circular waveguide section 19 (a Ds to D1 section). The taper is sufficiently gradual as not to cause reflections and increase the VSWR of the system.

Clearly, the TM01 mode can be sustained in the main waveguide 20, but is not likely to arise there unless orthogonal TE11 modes occur. Furthermore, the technique of producing complimentary polarization to compensate for the orthogonal TE11 mode that may arise in the main waveguide, as taught hereinbelow and in the copending application, insures that such orthogonal modes are negated.

Technique of Producing Complementary Polarization

In the specific embodiment illustrated herein in FIG. 9, the undesired polarization due to ellipticity (imperfect circularity) of the main waveguide 20 is compensated for by producing complementary polarization. This is accomplished by deliberately causing a complementary wave at the base of the main circular waveguide (D1) near the bottom of the tower so that when the intended wave and the complementary wave are modified by imperfections (including imperfect circularity) throughout the length of the main waveguide, there results at the other end thereof a pure linear polarized wave that can be efficiently coupled via the transition sections 21' from main to the rectangular waveguide feed 25 to the radiating antenna 12 at the top of the tower.

Figure 5:
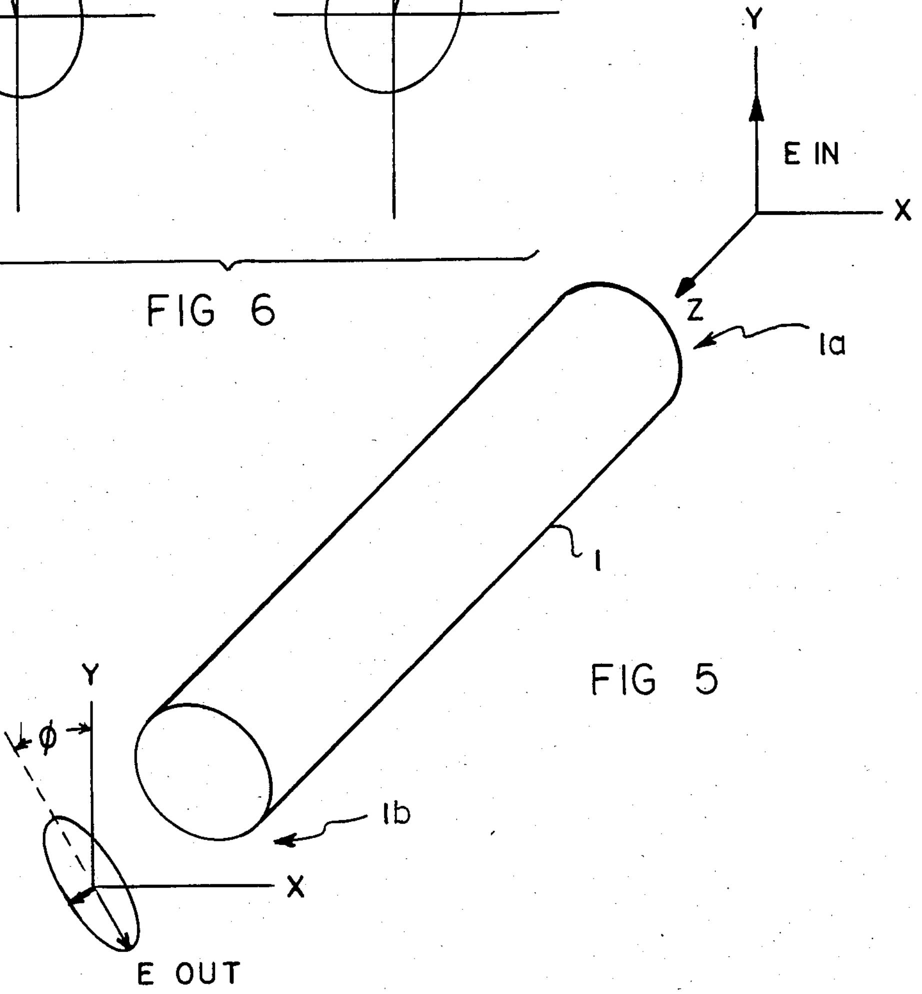
FIG. 5 shows a circular waveguide and vectors representing polarized waves launched into one end of the waveguide and out the other end to illustrate the depolarization effect of the imperfectly circular guide.

Turning next to FIG. 5, there is illustrated the depolarizing effect of an imperfect circular waveguide. This figure shows the desired input to be linear TE11 mode at one end of the waveguide. As shown, the principle vector Y of a TE11 linear wave enters the imperfect circular waveguide 1 at one end 1*a* thereof. At the other end 1*b* of the circular waveguide the wave emerges as two waves whose principal vectors are displaced in orientation and in phase, resulting in a polarization ellipse at that point characterized by an axial ratio at the orientation angle $\phi$ and a sense of rotation.

Figure 6:
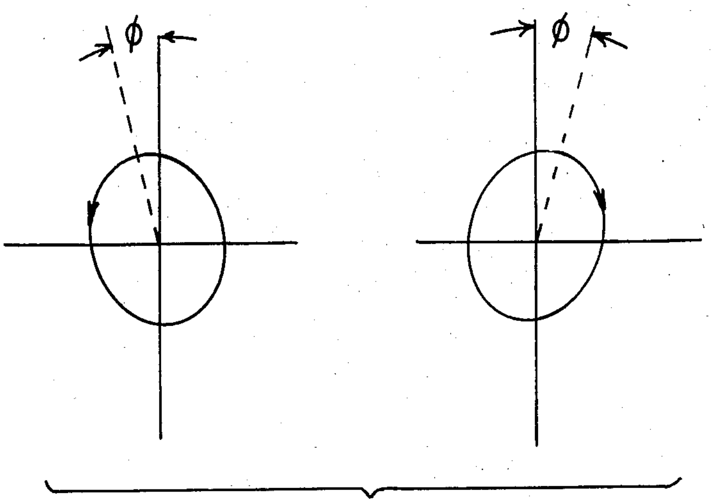
FIG. 6 shows vector diagrams illustrating complementary elliptical polarizations.

What has been generated by the imperfections of the waveguide could also be generated by deliberately deforming the waveguide. More particularly, if a complementary ellipse had been deliberately generated in the structure as shown in FIG. 5, the polarization ellipse at the output would have been corrected leaving the output linearly polarized just like the input. Complementary ellipses of polarization are shown in FIG. 6 where the axial ratios are identical; that is, the ratio of major to minor axis are the same. Rotation sense, however is opposite and so the angular displacements $\phi$ of these ellipses are complementary.

Figure 7:
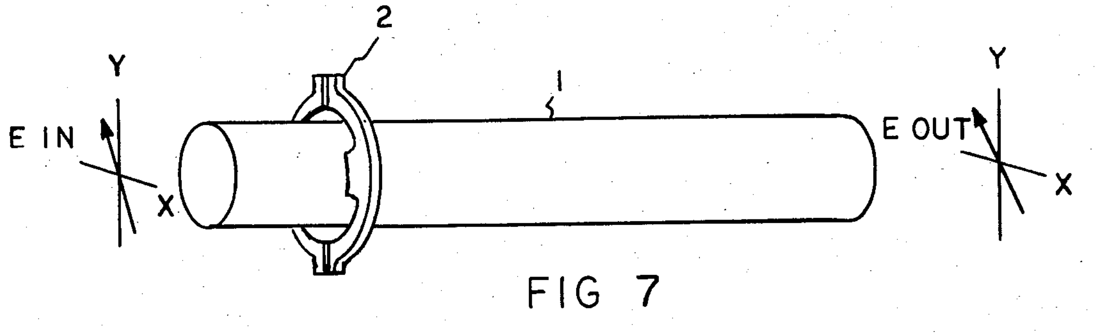
FIG. 7 shows an ellipse producing structure attached to a circular waveguide that can be used to generate polarization ellipticity of polarized waves launched into one end of the waveguide.
Figure 8:
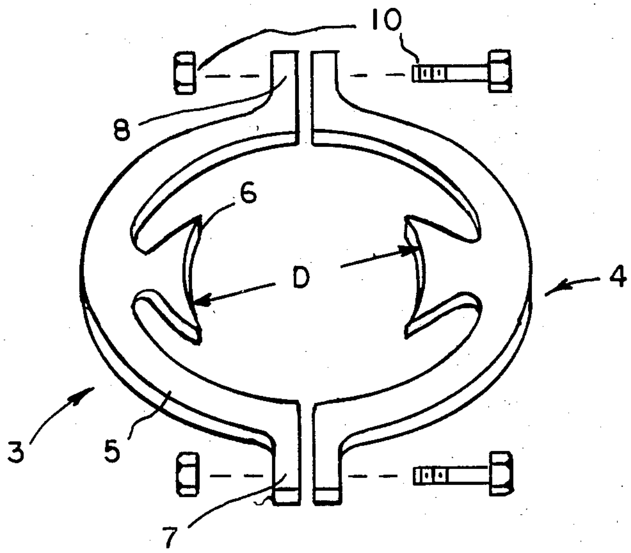
FIG. 8 is a detailed view of the structure.

FIG. 7 illustrates a technique of producing the complementary ellipse. As shown in FIG. 7, the circular waveguide 1 has attached to the outside thereof a device 2 which may be called an ellipse generator. The device is also shown in FIG. 8. The two members 3 and 4 of the device 1, as illustrated in FIG. 8, are mirror images and encircle the circular waveguide. Each consist of a frame 5 and a part thereof which may be called a pressure foot 6 and flanges 7 and 8 at the ends for connecting the two members together so that they encircle the waveguide and means 10 for adjusting the load administered by the pressure foot of one and the pressure foot of the other against the circular waveguide to distort the dimensions thereof.

In FIG. 7, the device is shown installed on the waveguide. The position on the waveguide and the angular orientation may be adjusted to suit the situation and the amount of deformation is controlled by the adjusting means 10. Clearly, the longitudinal position of the device, on the circular waveguide is adjustable, the radial direction of the force of distortion that is applied to the outside of the circular waveguide by the device is adjustable and the amount of that force is adjustable. Thus, there are three physical parameters of adjustment available to the user to bring about the desired effect. A measure of the desired effect may be had at by measuring the VSWR in the circular waveguide. If the compensation has been effective, then the RF energy at the output is all polarized in the same direction and there is no ellipticity. In that case, coupling from the output end to the radiating antenna can be very efficient. On the other hand, if such is not the case, then the coupling via the circular to rectangular waveguide transition is less efficient and is indicated by the VSWR.

UHF TV Broadcast Antenna System

FIG. 9 shows a UHF TV broadcast antenna system including a tower 11 with a radiating monopole antenna 12 at the top thereof supporting the main circular waveguide transmission line 20. At the bottom of the tower, the transmitter 14 feeds RF power by input rectangular waveguide 15, rectangular waveguide elbow 16 and the rectangular to main circular (D1) waveguide set of transitions 21 that is shown and described more fully herein with reference to FIGS. 2, 3 and 4*a* to 4*d*.

At the top of the tower, the main circular waveguide 20 is coupled to the radiating antenna 12 via the set of transitions 21'. This may be done using the same sort of transitions as used as at the bottom of the tower. For example, a tapered D1 to Ds section 19' from the main to a relatively smaller diameter (Ds) circular waveguide section 18' and a circular to rectangular waveguide transition section 17' couples to elbow 24 of the output rectangular waveguide 25 that feeds RF to the antenna 12 via coupler 27.

The input and the ouput (bottom and top) rectangular waveguides 15 and 25, respectively, may be the same size waveguide and the bottom and top transitions 21 and 21' may be the same and so the total transmission line from the transmitter 14 to the antenna 12 may be electrically symmetrical.

In order to achieve the desired TE11 mode in the main circular waveguide 20, the input rectangular waveguide line 15 conducts waves in the TE10 mode at the operating frequency F and it is preferably cut off to the TM11 mode. It is preferably cut off to the TM11 mode, because that mode has a tendancy to induce the TM01 mode in a following circular waveguide.

As mentioned above, the TE10 rectangular waveguide mode is analogous to the TE11 circular waveguide mode and so the purpose of transition 17 is to feed all of the energy of the TE10 rectangular mode from 15 into TE11 circular mode in the small circular waveguide section section 18. At this feed, any tendancy to start a TM01 mode in 18 is suppressed, because 18 is cut off to the TM01 mode inasmuch as its diameter is too small to sustain the TM01 mode at F. Following section 18, the tapered circular waveguide section 19 that feeds the main waveguide 20 is smooth and there is nothing therein to cause wave energy to couple from the TE11 to the TM01 mode even though the main waveguide 20 is not cut off to the TM01 mode.

Clearly, the efficiency of these transitions 21 and 21' and the coupling to the antenna 12 will depend upon the singularity of polarization of the RF energy at the end of the main circular waveguide transmission line 20. It is presumed that the transitions 21 and 21' do not effect this efficiency and do not introduce or sustain the undesired modes or ellipticity. In order to insure the singularity of that polarization, the ellipse generator device 28 is attached to the main waveguide 20 at the bottom of the tower where there is ready access, and positioned and adjusted as already described to produce a minimum VSWR therein. This is done by detecting the VSWR at the bottom end of 20 and carrying signals to the VSWR meter 30 at the bottom of the tower.

In operation the ellipse generator device 28 is adjusted by an operator while observing the VSWR meter 30 to produce a minimum reading. Thereafter, from time to time, the same measurement can be made and the device adjusted to correct for expansion, contraction, and other mechanical changes in the transmission line.

The transition sections 21 and 21' between rectangular and circular waveguide according to the present invention has particularly useful application as the feed to and/or from the main circular waveguide carried by the tower of a high power UHF TV broadcast antenna as described herein with reference to the specific embodiment. When used along with the technique described herein of compensating for imperfections in a circular waveguide by producing complementary polarization to compensate for those imperfections, the disadvantages of circular waveguide are overcome. Clearly, the same transition sections and techniques described herein could be applied in other systems for the same and other advantages without departing from the spirit and scope of the invention as set forth in the claims.

What is claimed is:

1. In a high power antenna system for UHF TV frequency (F) broadcast wherein a radiating antenna is located at the top of a tower structure many hundreds of feet high and a transmitter is located at the bottom of the tower, a relatively large diameter circular waveguide transmission line of diameter D1 is provided for conducting the UHF power from the transmitter up the tower to the antenna and the UHF power is fed to said circular waveguide transmission line from said transmitter by an input rectangular waveguide transmission line, and there is transmission line means between said input rectangular and said circular waveguide transmission lines for insuring that wave propagation in said circular waveguide transmission line is substantially totally in the dominant TE11 mode at the frequency F, although F is above the cut off frequency of the TM01 mode therein, the improvement comprising, (a) wave propagation in said input rectangular waveguide transmission line is substantially totally in the dominant TE10 mode therein at the frequency F, (b) a section of relatively small diameter circular waveguide of diameter Ds that has an input end and an output end, said diameter Ds being such that F is below the cutoff frequency of the TM01 mode in said small diameter circular waveguide section, (c) a tapered transition section having a rectangular waveguide cross section at the input end thereof that connects to and matches said input rectangular waveguide transmission line from said transmitter and has a circular waveguide cross section at the output end thereof that connects to and matches said circular waveguide section of diameter Ds and (d) a tapered circular waveguide section having an input end of diameter Ds connected to the output end of said circular waveguide section of diameter Ds and an output end of diameter D1 connected to the input end of said circular waveguide transmission line of diameter D1, (e) all of said connections being substantially matched, (f) whereby the propagation mode of waves launched into said circular waveguide transmission line from said input rectangular waveguide through said sections is substantially totally in the dominant TE11 mode at the frequency F, although F is above the cut off frequency of the TM01 mode therein and resonance of said dominant TE11 mode therein is avoided.

2. An antenna system as in claim 1 wherein Ds is such that F is above the cutoff frequency of the TE11 mode in said small diameter circular waveguide section.

3. An antenna system as in claim 1 wherein successive cross sections of said tapered transition section along the length thereof from said input rectangular transmission line to said small diameter circular waveguide section exhibit a gradual change from a rectangle to a circle of diameter Ds.

4. An antenna system as in claim 1 wherein the cross sectional dimensions of said input rectangular waveguide transmission line are such that F is below the cutoff frequency of the TM11 mode therein.

5. An antenna system as in claim 2 wherein the cross sectional dimensions of said input rectangular waveguide transmission line are such that F is below the cutoff frequency of the TM11 mode therein.

6. In a high power antenna system for UHF TV frequency (F) broadcast wherein a radiating antenna is located at the top of a tower structure many hundreds of feet high and a transmitter is located at the bottom of the tower, a relatively large diameter circular waveguide transmission line of diameter D1 is provided for conducting the UHF power from the transmitter up the tower to the antenna and the UHF power is fed from the circular waveguide transmission line to the antenna by an output rectangular waveguide transmission line, and there is transmission line means between said circular waveguide transmission line and said output rectangular waveguide transmission line to the antenna for insuring that wave propagation in said circular waveguide transmission line is substantially totally in the dominant TE11 mode at the frequency F, although F is above the cut off frequency of the TM01 mode therein, the improvement comprising, (a) wave propagation in said output rectangular waveguide transmission line is substantially totally in the dominant TE10 mode therein at the frequency F, (b) a section of relatively small diameter circular waveguide of diameter Ds that has an input end and an output end, said diameter Ds being such that F is below the cutoff frequency of the TM01 mode in said small diameter circular waveguide section, (c) a tapered transition section having a rectangular waveguide cross section at the output end thereof that connects to and matches said output rectangular waveguide transmission line to the antenna and has a circular waveguide cross section at the input end thereof that connects to and matches the output end of said circular waveguide section of diameter Ds and (d) a tapered circular waveguide section having an input end of diameter D1 connected to the output end of said circular waveguide transmission line of diameter D1 and an output end of diameter Ds connected to the input end of said circular waveguide section of diameter Ds, (e) all of said connections being substantially matched, (f) whereby said wave propagation in said circular waveguide transmission line is substantially totally in the dominant TE11 mode at the frequency F, although F is above the cut off frequency of the TM01 mode therein and the propagation mode of waves launched into said output rectangular waveguide from said circular waveguide transmission line through said sections is substantially totally in the TE10 mode therein and resonance of said dominant TE11 mode therein is avoided.

7. An antenna system as in claim 6 wherein Ds is such that F is above the cutoff frequency of the TE11 mode in said small diameter circular waveguide section.

8. An antenna system as in claim 6 wherein successive cross sections of said tapered transition section along the length thereof from said output rectangular transmission line to said circular waveguide section of diameter Ds exhibit a gradual change from a rectangle to a circle of diameter Ds.

9. An antenna system as in claim 6 wherein the cross sectional dimensions of said output rectangular waveguide transmission line are such that F is below the cutoff frequency of the TM11 mode therein.

* * * * *